United States Patent
Wang et al.

(10) Patent No.: US 9,918,151 B2
(45) Date of Patent: Mar. 13, 2018

(54) OPTICAL NETWORK UNIT, AND COMMUNICATIONS SYSTEM AND METHOD

(71) Applicant: ZTE CORPORATION, Shenzhen, Guangdong Province (CN)

(72) Inventors: Rihong Wang, Shenzhen (CN); Li Sun, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 21 days.

(21) Appl. No.: 14/783,079

(22) PCT Filed: Apr. 30, 2014

(86) PCT No.: PCT/CN2014/076601
§ 371 (c)(1),
(2) Date: Oct. 7, 2015

(87) PCT Pub. No.: WO2014/206144
PCT Pub. Date: Dec. 31, 2014

(65) Prior Publication Data
US 2016/0112778 A1    Apr. 21, 2016

(30) Foreign Application Priority Data
Jun. 27, 2013 (CN) .......................... 2013 1 0265503

(51) Int. Cl.
*H04B 10/60* (2013.01)
*H04Q 11/00* (2006.01)

(52) U.S. Cl.
CPC ......... *H04Q 11/0067* (2013.01); *H04B 10/60* (2013.01); *H04Q 11/0003* (2013.01);
(Continued)

(58) Field of Classification Search
CPC .................................................... H04B 10/60
See application file for complete search history.

(56) References Cited

U.S. PATENT DOCUMENTS

2004/0120315 A1* 6/2004 Han .................. H04Q 11/0067
370/389
2008/0273878 A1* 11/2008 Wu ........................ H04J 3/1694
398/67
(Continued)

FOREIGN PATENT DOCUMENTS

CN       101516044 A      8/2009
CN       102130718 A      7/2011
(Continued)

OTHER PUBLICATIONS

Virtual Home Gateway: How can Home Gateway virtualization be achieved? EURESCOM; Daniel Abgrall et al. Sep. 2011; XP55168346A.

*Primary Examiner* — Nathan Curs
(74) *Attorney, Agent, or Firm* — Ling Wu; Stephen Yang; Ling and Yang Intellectual Property

(57) ABSTRACT

An optical network unit (ONU), a communication system and a communication method are disclosed. The ONU includes a passive optical network media access control (PON MAC) module and a processing module, the processing module includes a physical bridge submodule and at least two ONU submodules connected with the physical bridge submodule, different ONU submodules correspond to different identification information; the PON MAC module is configured to: be connected with the processing module, determine corresponding ONU submodules according to identification information in network side data, and send the network side data to the physical bridge submodule; the physical bridge submodule is configured to: distribute the network side data to corresponding ONU submodules according to the ONU submodules determined by the PON MAC module; and the ONU submodule is configured to:

(Continued)

process the received data, and send the data to the user interface module corresponding to the ONU submodule.

9 Claims, 6 Drawing Sheets

(52) U.S. Cl.
CPC ............... *H04Q 2011/0064* (2013.01); *H04Q 2011/0086* (2013.01); *H04Q 2213/1301* (2013.01)

(56) References Cited

U.S. PATENT DOCUMENTS

| | | | | |
|---|---|---|---|---|
| 2010/0239247 A1* | 9/2010 | Kani | ................... | H04J 14/0282 398/41 |
| 2012/0195596 A1* | 8/2012 | Yang | .................. | H04Q 11/0067 398/58 |
| 2016/0119058 A1* | 4/2016 | Wang | .................. | H04B 10/272 398/58 |
| 2016/0329980 A1* | 11/2016 | Zheng | ................ | H04Q 11/0067 |

FOREIGN PATENT DOCUMENTS

| | | | | |
|---|---|---|---|---|
| CN | 102149026 A | 8/2011 | | |
| CN | 104218995 A | 12/2014 | | |
| EP | 1976197 A1 | 10/2008 | | |
| EP | 2501058 A1 * | 9/2012 | ............. | H04B 10/08 |
| EP | 2501058 A1 | 9/2012 | | |

* cited by examiner

OPTICAL NETWORK UNIT, AND COMMUNICATIONS SYSTEM AND METHOD

TECHNICAL FIELD

The present document mainly relates to the field of network equipment technology, and particularly, to an optical network unit, a communication system and a communication method.

BACKGROUND OF THE RELATED ART

An Optical Line Terminal (OLT) is a terminal device used for connecting fiber trunk lines and implementing functions such as control and management on the user end equipment Optical Network Unit (ONU).

The Optical Network Unit (ONU) is an optical access network device and commonly used in corridors or households.

Integrated Terminal Management System (ITMS).

The TR-069 (DSL Forum CPE WAN Management Protocol) is one of technical specifications developed by the DSL Forum (www.dslforum.org), and its full name is "CPE wide area network management protocol". It provides a general framework and protocol for performing management and configuration on home network devices in the next generation network, which is used for performing remote and centralized management from a network side on devices such as a gateway, router and set top box, etc. in the home network.

In Wide Area Network Connection (WAN Connection), WAN is an abbreviation of wide area network, and WAN connection is a way of connecting one device to the WAN. For example, outbound connection modes of the home gateway device include an ADSL mode, an LAN Ethernet mode and an Ethernet Passive Optical Network (EPON)/Gigabit-Capable Passive optical network (GPON) mode. In this case, we say that a WAN connection of the home gateway is an ADSL, Ethernet or EPON/GPON.

E8 refers to a China telecom home gateway, E8C refers to a China telecom C-type home gateway. The China telecom home gateway is managed through the TR069 protocol.

In Fiber-to-the-x (FTTx) fiber access, x refers to an access point. Wherein Fiber-to-the-Building (FTTB) refers to Fiber to the Building, and Fiber-to-the-Home (FTTH) refers to Fiber to the home.

The main problems which the FTTH is facing are: 1. Home entry is difficult, and fiber deployment is not easy; 2. FTTH home-entry cost is higher, and a problem of insufficient construction funds is prominent; 3. Secondary optical splitting also increases the construction cost. The FTTB is confronted with a problem that constructions mainly popularized by the non-operators are passive, which cannot better solve a problem of real installing assessment rate and a problem that the power supply problem is difficult to solve.

In the related art, in order to solve the problems which the FTTH and FTTB are facing at present, a fiber access scheme called enhanced FTTH is disclosed, the scheme uses a plug-in card mode, the ONU is made into a daughter card to be inserted into a machine frame, each daughter card is an independent ONU, the machine frame can be flexibly placed in the corridors or doorways, home entry is implemented with the original wirecables (network lines or telephone lines), each card can provide an access way flexibly to support broadband access and voice services, a drop-install flow of the FTTH is not changed, and the power supply problem also can be better solved, and the construction cost is also reduced as much as possible.

The common scheme for implementing the enhanced FTTH device is that each daughter card has an independent CPU and PONMAC, and all daughter cards share the same optical module as show in FIG. 1, thus each daughter card does not perceive the existence of the other daughter cards, an advantage of such implementation is relatively simple software implementation, and the original ONU software can be used without any change, but a shortage is that:

hardware cost is also higher, since each ONU has the CPU and PONMAC, and especially an FPGA is introduced in order to implement sharing of the optical module, the cost rises perpendicularly with the increasing number of daughter cards.

With the increase of the uplink interface speed, the FPGA cannot be fast switched between the ONUs, which causes that an uplink interface rate has a bottleneck, and fails to introduce an uplink interface with a higher rate.

SUMMARY

The technical problem required to be solved in the present document is to provide an optical network unit, a communication system and a communication method, to solve the problem of high hardware cost in the existing scheme.

In order to solve the above technical problem, the present document provides an optical network unit (ONU), which comprises: a passive optical network media access control (PON MAC) module, a processing module and at least two user interface modules, wherein, the processing module comprises a physical bridge submodule and at least two ONU submodules connected with the physical bridge submodule, the ONU submodules are in one-to-one correspondence with the user interface modules, and different ONU submodules correspond to different identification information;

the PON MAC module is configured to: be connected with the processing module, and receive network side data, wherein the network side data comprise identification information; determine corresponding ONU submodules according to the identification information in the network side data, and send the network side data to the physical bridge submodule;

the physical bridge submodule is configured to: distribute the network side data to corresponding ONU submodules according to the ONU submodules determined by the PON MAC module; and the ONU submodule is configured to: process the received data, and send the data to the user interface module corresponding to the ONU submodule.

Preferably, the PON MAC module is configured to: add information of the ONU submodule into the network side data to send to a second bridge submodule, or after sending the network side data, send information of an association relationship between the network side data and the corresponding ONU submodules to the second bridge submodule.

Preferably, the ONU submodule comprises an ONU process processing unit, an ONU routing unit and a virtual bridge unit orderly connected;

the virtual bridge unit is configured to: store port information of the ONU submodule, and send data from a user side to the ONU process processing unit via the ONU routing unit; wherein the virtual bridge units of various ONU submodules are mutually isolated;

the ONU routing unit is configured to: set a routing table for the ONU submodules; and the ONU process processing unit is configured to: process the received data from the user side.

Preferably, the physical bridge submodule is configured to: be respectively connected with the virtual bridge units of the various ONU submodules, perform port conversion on the data from the user side and then send to the corresponding virtual bridge units and perform port conversion on the data from the corresponding virtual bridge units and then send to Ethernet ports.

Preferably, the identification information is an optical network unit identifier (ONUID), a gigabit-capable passive optical network (GPON) encapsulation port (GEMPORT), a passive optical network media access control (PON MAC) address or a logical link identifier (LLID).

In order to solve the above technical problem, the present document further provides a communication system, which comprises: an optical line terminal and an optical network unit (ONU) as mentioned above, wherein the optical line terminal is in a communication connection with the ONU.

Preferably, the communication system further comprises an integrated terminal management system, wherein the integrated terminal management system is in a communication connection with the ONU.

In order to solve the above technical problem, the present document further provides a communication method for an optical network unit (ONU), wherein the ONU comprises a passive optical network media access control (PON MAC) module, a processing module and at least two user interface modules, the processing module comprises a physical bridge submodule and at least two ONU submodules connected with the physical bridge submodule, the ONU submodules are in one-to-one correspondence with the user interface modules, and different ONU submodules correspond to different identification information;

the PON MAC module receives network side data, wherein the network side data comprise identification information;

the PON MAC module determines corresponding ONU submodules according to the identification information in the network side data, and sends the network side data to the physical bridge submodule;

the physical bridge submodule distributes the network side data to corresponding ONU submodules according to the ONU submodules determined by the PON MAC module; and the ONU submodule processes the received data and then sends the processed data to the user interface module corresponding to the ONU submodule.

Preferably, the PON MAC module adds information of the ONU submodules into the network side data to send to a second bridge submodule, or after sending the network side data, sends information of an association relationship between the network side data and the corresponding ONU submodules to the second bridge submodule.

Preferably, the identification information is an optical network unit identifier (ONUID), a gigabit-capable passive optical network (GPON) encapsulation port (GEMPORT), a passive optical network media access control (PON MAC) address or a logical link identifier (LLID).

Compared with the related art, the ONU provided in the embodiment of the present document comprises a passive optical network media access control (PON MAC) module, a processing module and at least two user interface modules, the processing module comprises a physical bridge submodule and at least two ONU submodules connected with the physical bridge submodule, the ONU submodules are in one-to-one correspondence with the user interface modules, and different ONU submodules correspond to different identification information; the PON MAC module determines corresponding ONU submodules according to identification information in network side data, and sends the network side data to the physical bridge submodule. As it can be seen that, the ONU provided in the present document is not required to set the CPU and PON MAC, etc. on each user interface card, it is only required to set a user interface circuit on the user interface card, then all functions of one existing ONU are implemented by coordinating with the corresponding ONU submodules in the processing module, and it is not required to set the FPGA to implement the switching to the ONU, therefore, while the hardware cost is greatly reduced, a limitation of the FPGA switching on the existing ONU can be removed, and an uplink interface rate can be increased. Moreover, since shared PONMAC is used, the OLT can distinguish a virtual ONU, thus the virtual ONU can be managed by using an OMCI or an extended OAM protocol.

PREFERRED EMBODIMENTS OF THE INVENTION

The technical scheme of the present document will be further described in detail in combination with the accompanying drawings and specific embodiments below, so that the skilled in the art can better understand the present document and implement the present document, but the illustrated embodiments are not a limitation on the present document. It should be noted that the embodiments in the present document and the characteristics in the embodiments can be combined with each other in the condition of no conflict.

An optical network unit (ONU) in the embodiment of the present document includes a passive optical network media access control (PON MAC) module, a processing module and at least two user interface modules; a physical bridge submodule and at least two ONU submodules connected with the physical bridge submodule are included in the processing module, the ONU submodules are in one-to-one correspondence with the user interface modules, and different ONU submodules correspond to different identification information;

The user interface modules are connected with the ONU submodules through a Switch module. The ONU provided in the embodiment of the present document can provide at least two virtual ONUs, each virtual ONU is not required to set an independent CPU and PON MAC and so on, it is only required to set a user interface circuit on a user interface card to share the PON MAC, and functions of the existing ONU are implemented by forming a virtual ONU with corresponding ONU submodules in the processing module, and it is not required to set an FPGA to implement the switching to the ONU, and multiple virtual ONU terminals share a same PONMAC chip, which implements the registration and authentication function of the PON. Therefore, while the hardware cost is greatly reduced, a limitation of the FPGA switching to the existing ONU can be removed, and an uplink interface rate can be increased. The present document will be further described in combination with the specific embodiments below.

Figure 1:
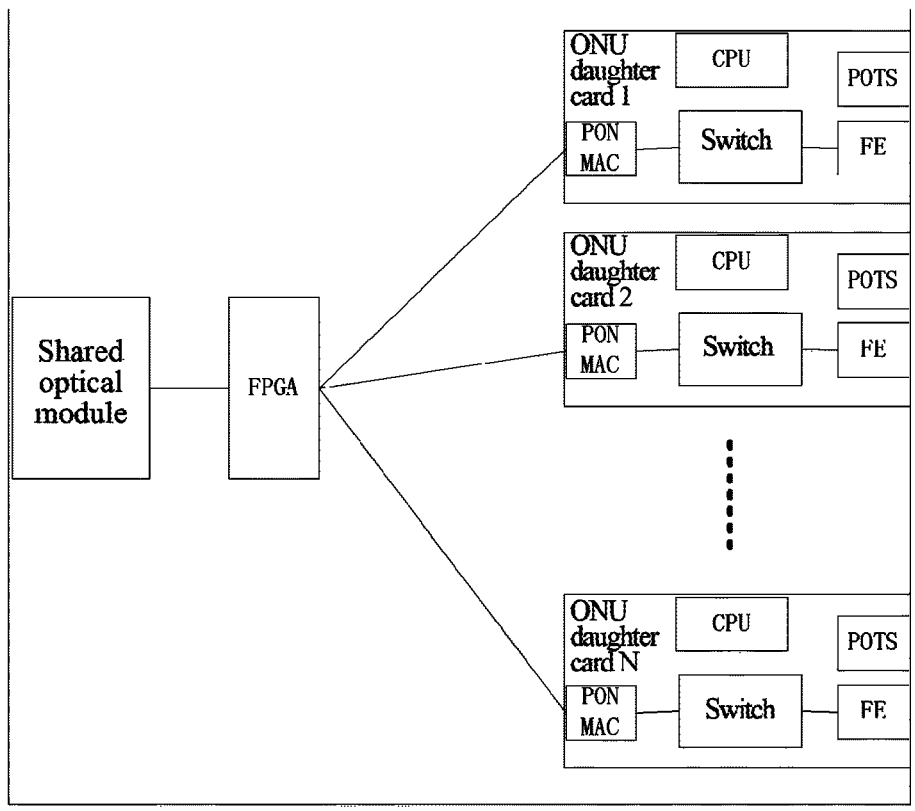
FIG. 1 is a schematic diagram of structure of an ONU.
Figure 2:
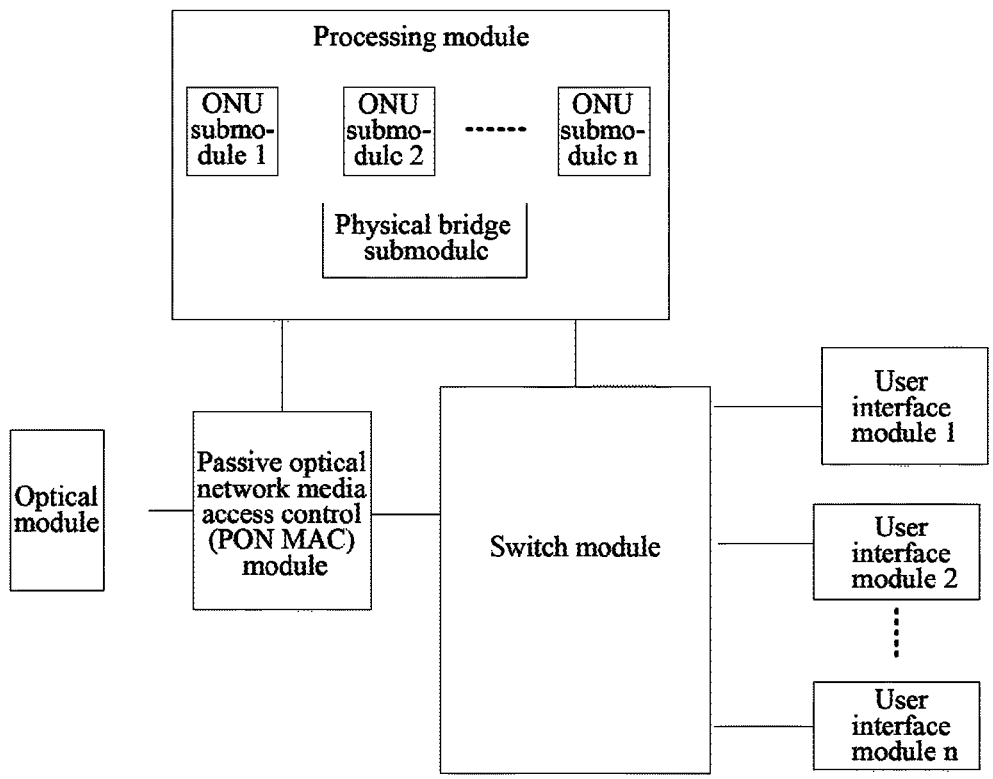
FIG. 2 is a schematic diagram of structure of an ONU provided in the embodiment of the present document.

As shown in FIG. 2, the figure shows a schematic diagram of structure of an ONU provided in the embodiment, an optical module, a passive optical network media access control (PON MAC) module, a processing module (CPU) and a Switch module orderly connected are included; and at least two user interface modules are also included, and the user interface modules are connected with the processing module via the switch module. In the embodiment, the user interface modules also can be implemented in the form of interface cards, and in the embodiment, it is only required to set user interface circuits on the user interface cards, for example, an FE interface circuit and/or a POTS interface circuit is included. As it can be seen that, in the embodiment, it is not required to set the CPU and PON MAC, etc. on each interface card, thus the hardware cost of the ONU can be reduced. Meanwhile, at least two ONU submodules are set in the processing module (CPU) in the embodiment, the set ONU submodules are in one-to-one correspondence with the user interface modules; and the user interface modules are connected with the ONU submodules via the switch module. In the embodiment, the set multiple ONU submodules are mutually independent (namely mutually isolated), that is, none of the ONU submodules will perceive the existence of the other ONU submodules. Specifically, the specific functions of the above modules are described as follows.

The optical module is configured to receive network side data and send data to the network side, and perform optoelectronic signal conversion in the process of receiving and sending;

the passive optical network media access control (PON MAC) module is connected with the optical module, and is configured to control access of the optical module, particularly related to the present document, the PON MAC module is configured to receive the network side data forwarded by the optical module, and identification information is included in the network side data; it is also configured to determine corresponding ONU submodules according to the identification information in the network side data, and send the network side data to a physical bridge submodule;

The identification information mentioned in the embodiment of the present document refers to information that can be used for distinguishing different ONU submodules, specifically, network environments in which the optical network unit is located are different, specific identification information corresponding to the ONU submodules is also different, in a Gigabit-Capable Passive Optical Network (GPON) network environment, identification information in an OMCI management protocol message can be an optical network unit identifier (ONUID) or a GPON encapsulation port (GEMPORT), and in an Ethernet Passive Optical Network (EPON) network environment, identification information in an extended OAM management protocol message can be a passive optical network media access control (PON MAC) address or a Logical Link Identifier (LLID). The specific identification information is not limited in the present document.

Specifically, the way of the PON MAC module transferring information of the ONU submodules is not limited in the embodiment of the present document, for example, the PON MAC module can add the information of the ONU submodules into the network side data to send to the second bridge submodule, or after sending the network side data, send information of an association relationship between the network side data and the corresponding ONU submodules to the second bridge submodule.

The physical bridge submodule is configured to distribute the network side data to the corresponding ONU submodules according to the ONU submodules determined by the PON MAC module;

the processing module is connected with the PON MAC module and the switch module, and is configured to process the user side data and the network side data; and The ONU submodules of the processing module are configured to implement all functions of various functional modules (except the user interface modules) of one existing ONU; for a better understanding, it will be described in detail in combination with the various functional modules of the ONU submodules below.

The switch module is connected with the processing module and the user interface modules, and is configured to forward data between the processing module and the user interface modules;

the user interface modules are configured to receive the user side data, and forward the user side data to the processing module via the switch module; and receive the network side data forwarded by the processing module via the switch module.

As seen from the above, the ONU hardware in the embodiment includes a CPU (it can be multi-core), a SWITCH chip, a PON MAC and an optical module, user interfaces such as an FE interface and/or POTS interface are inserted into a machine frame in the form of interface cards, and the CPU and PON MAC, etc. are not set on the interface cards. An interface on each interface card belongs to one user (that is, one user interface module corresponds to one user), and all the interface cards (i.e. all the user interface modules) share the CPU, PONMAC and optical module and are connected through one Switch. An interface between the shared PON MAC chip and the SWITCH is not limited, it can be a link, or it also can be that each user interface module corresponds to one link. Though an enhanced FTTH in the embodiment is still implemented as a machine frame, the user interface corresponding to each ONU is still made on one interface card, but there is only an interface circuit of the user side of the ONU on the interface card; the CPU, PONMAC, optical module and switch chip are set on a mainboard, all the interface cards can share the CPU, PONMAC and optical module through a backplane bus, and divide data from the daughter cards and PON to the corresponding ONU submodules included in the process module through software, so as to simulate multiple existing ONUs.

The scheme of the embodiment of the present document is applicable to an HGU-type home gateway and an SFU-type home gateway, it is an access way in which management is performed by using the TR069 or OMCI/OAM, in this way, after an ONU registers to an OLT, that is, after it establishes a physical connection with the OLT, the OLT can see the existence of multiple ONUs, the following management flow can be performed through an extended OAM or OMCI, or it also can be performed through a TR069 protocol and ITMS. The TR069 protocol is borne through an IP, and each ONU will establish a WAN connection pointing to the ITMS, which is used to route the TR069 protocol.

If the following configuration management flow is performed by using the OAM/OMCI, the management protocol is distinguished through the identification information (e.g. the ONUID or LLID), and is allocated to a corresponding virtual home gateway process.

Firstly it is required to go through a registration and authentication flow between each ONU submodule and the ITMS, the authentication is divided into an initial connection device authentication and a non-initial connection device authentication, the initial connection device authentication includes two ways: based on a physical ID (e.g. a device serial number and so on) and based on a logical ID (e.g. a broadband Internet account and so on), thus one physical ID and/or logical ID is allocated to each user interface module in the embodiment, and the physical ID and/or logical ID is also a physical ID and/or logical ID of an ONU submodule corresponding to the user interface module. After the initial connection device authentication is passed, the ITMS can identify one ONU submodule according to the physical ID and/or logical ID and the WAN connection IP address of the TR069. Compared with the initial connection authentication, in the non-initial connection device authentication, a process of configuration and version sending in the authentication process is omitted, and all the other processes are the same.

Figure 4:
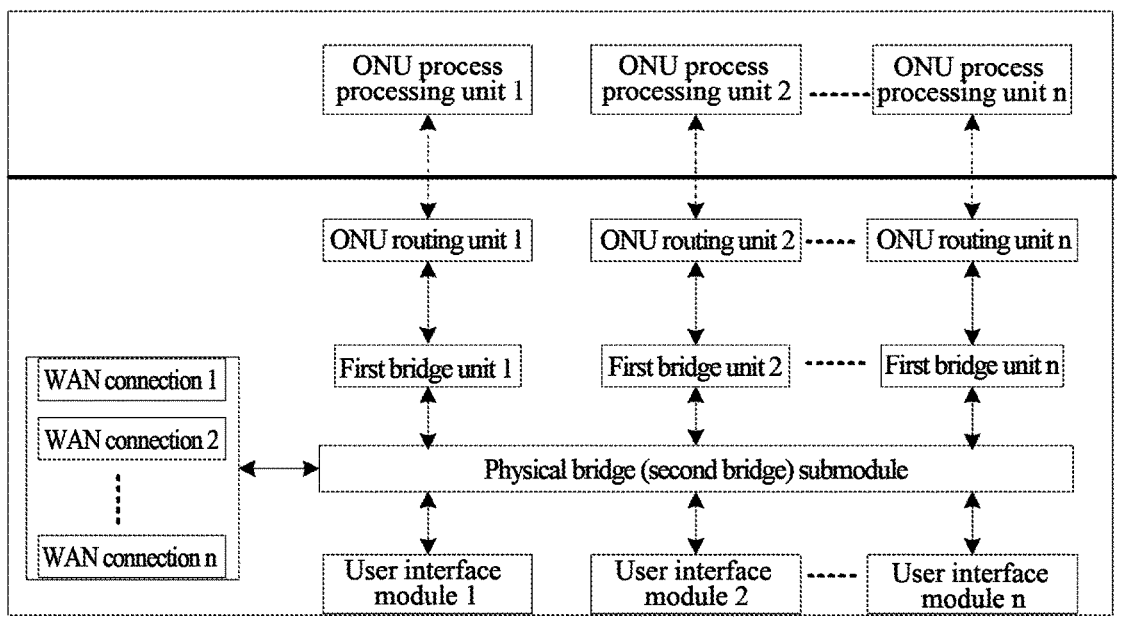
FIG. 4 is a schematic diagram 1 of structure of ONU submodules provided in the embodiment of the present document.

In order to make the ITMS detect multiple ONU submodules on one ONU, and each ONU submodule can operate independently, with reference to FIG. 4, the ONU submodules in the embodiment can specifically include the following functional units: logical databases, ONU process processing units, first bridge units and ONU routing units, wherein:

the logical databases, each ONU submodule includes one logical database, so that a database system can distinguish data and configuration information of each ONU submodule;

in the embodiment, data of multiple ONU submodules can be stored in one data table, but each ONU submodule can only see the data belonging to itself. That is, the logical databases of all the ONU submodules are mutually isolated.

In the embodiment, the data of the ONU submodules are divided into data operating in a memory and a data table stored in media such as a FLASH or hard disk. The data in the memory include various data generated in the operation process, such as a global configuration, user data and data during operation and so on, with regard to the data in the memory, in the embodiment, an independent process or process group is set through each corresponding ONU submodule, and by the operating system isolating the process, the data operating in the memory of all the ONU submodules are distinguished, and each ONU submodule does not have to perceive the existence of the other ONU submodules.

With regard to the data table saved in the media, descriptions will be made by taking the following two distinction ways as an example in the embodiment.

Way 1: Each ONU submodule uses an independent data table, data table names can be identical, but the data tables use independent databases or they are placed in different paths, each ONU submodule finds a database or path belonging to itself, and it can operate its own data table; certainly, the data table names also can be different, and one database can be used at this point.

Way 2: Only one data table used by all the ONU submodules exists and is saved in a database or a path, it is required to use a key field to distinguish and record which ONU submodule it belongs to in the data table, in order to operate conveniently, a data view is established for each ONU submodule in the embodiment, and each ONU submodule can only see and operate a data record belonging to itself.

Figure 5:
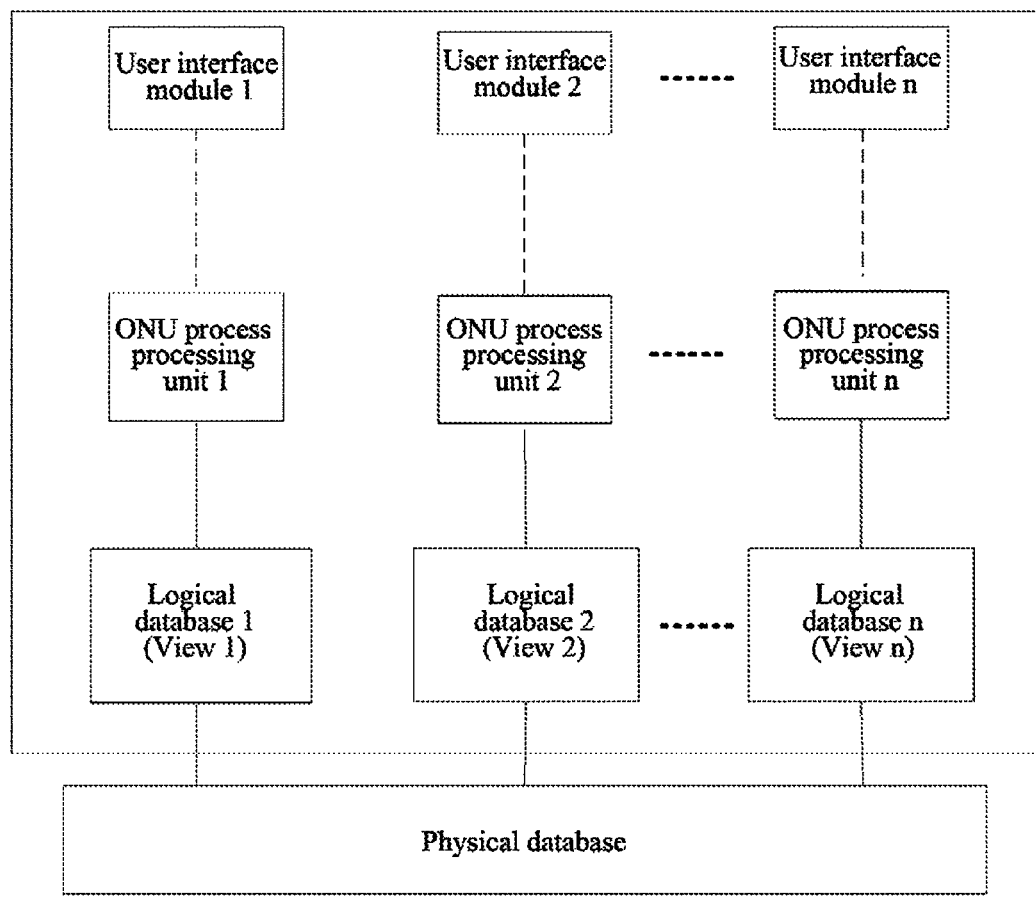
FIG. 5 is a schematic diagram 2 of structure of ONU submodules provided in the embodiment of the present document.

In the above way, the data tables and data during operation of all ONU submodules can be well distinguished, so that the ONU submodules are mutually isolated. In the embodiment, it can be specifically implemented by means of view, with reference to FIG. 5, each ONU submodule establishes a view belonging to itself, and it can only operate data belonging to itself through this view.

Figure 3:
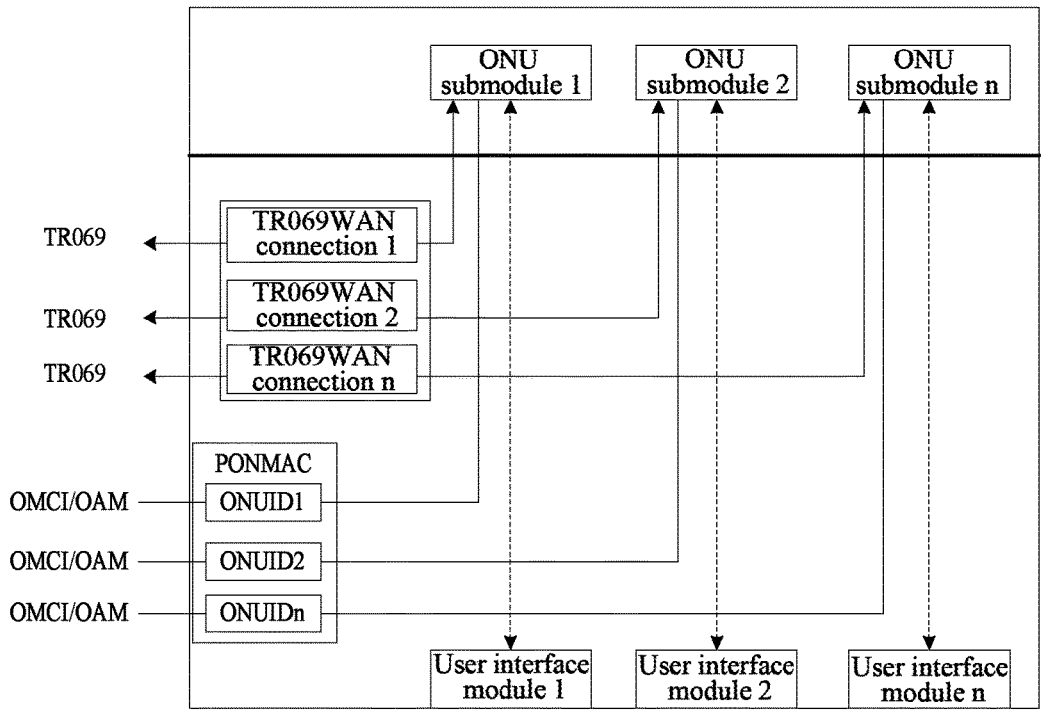
FIG. 3 is a schematic diagram of connection of ONU submodules provided in the embodiment of the present document.

As for the ONU process processing units, one ONU process processing unit is set for each ONU submodule, in a user mode, each set ONU process processing unit has a process or a group of processes, one user interface module is bound to an ONU process processing unit of one ONU submodule, and the ONU process processing unit is configured to perform corresponding processing on the data from the user side. An allocation relationship between user interface modules and ONU process processing units can be specifically in a correspondence with identification information of the user interface modules (such as a slot number and a device serial number, etc.). With reference to FIG. 3, a physical ID (e.g. the device serial number) and/or a logical ID also can be allocated for each user interface module (i.e. the daughter card), which is used to establish a corresponding TR069WAN connection to be used for device registration.

As for the first bridge units, one first bridge unit is set for each ONU submodule; in order to implement and support multiple ONU submodules in the embodiment, besides separating the above data in the user mode, a protocol stack part in a kernel mode is also required to distinguish an ONU submodule to which a user interface module corresponds, so as to perform corresponding operations, in the protocol stack of the kernel, starting with a bottomed Ethernet driver, it is a bridge, an IP layer routing and a transmission layer upward, and then an interface to a process in the user mode upward. In a physical bridge (i.e. kernel layer 2 bridge) module of the existing protocol stack, port data are required to be flooded to other ports within the physical bridge, if ports of all ONU submodules are placed in one physical bridge, it will cause that the data are flooded between the ONU submodules. Therefore, it is required to set one first bridge unit for each ONU submodule above the physical bridge of the protocol stack in the embodiment, and place port information belonging to the same ONU submodule in one first bridge unit, the port information of the ONU submodule includes various port information included in the user interface module corresponding to the ONU submodule in the embodiment.

The data between the first bridge units of all the ONU submodules are mutually isolated, so that a broadcast packet sent by a port within one first bridge unit cannot be flooded to ports of the first bridge units of the other ONU submodules, but a multicast protocol and a multicast stream in the virtual ONU do not need the mechanism of the first bridge unit, since a multicast function itself limits a distribution port of the multicast stream. In the embodiment, the first bridge unit replaces the function of the physical bridge of the protocol stack, the physical bridge in the embodiment only performs conversion from a port of the physical bridge to a port of the first bridge unit and data transceiving on the physical port, but a flooding function originally possessed by the physical bridge is cancelled.

As for the ONU routing units, one ONU routing unit is set for each ONU submodule at the IP layer of the protocol stack; since each ONU submodule has its own WAN connection, a user interface corresponding to each ONU submodule can only go out through a WAN connection of the ONU belonging to the user interface, thus an ONU routing unit is set for each ONU submodule to set its own routing table in the embodiment, a corresponding firewall function is also modified adaptively, and a configuration rule of Access Control Lists (ACL) is only applied within the ONU submodule and is not across a port corresponding to the ONU submodule.

In the embodiment, in order to make a transmission layer of the protocol stack distinguish a connection of each user, an IP address can be allocated to each ONU submodule, and an ONU routing unit of each ONU submodule acquires the IP address of the ONU submodule corresponding to the ONU routing unit, which is used to set a routing table for the ONU submodule. Meanwhile, in order to conform to the users' usage habits, a shared IP also can be set for the ONU in the embodiment, so that various ONU subunits included in the ONU can share the IP, specifically, each ONU submodule uses the shared IP address when sending data to the network side. In the embodiment, an ONU subunit included in the ONU can use the shared IP address of the ONU as its own IP address, and certainly it also does not need to use the IP address. Further descriptions will be made in combination with a specific implementation way.

Figure 6:
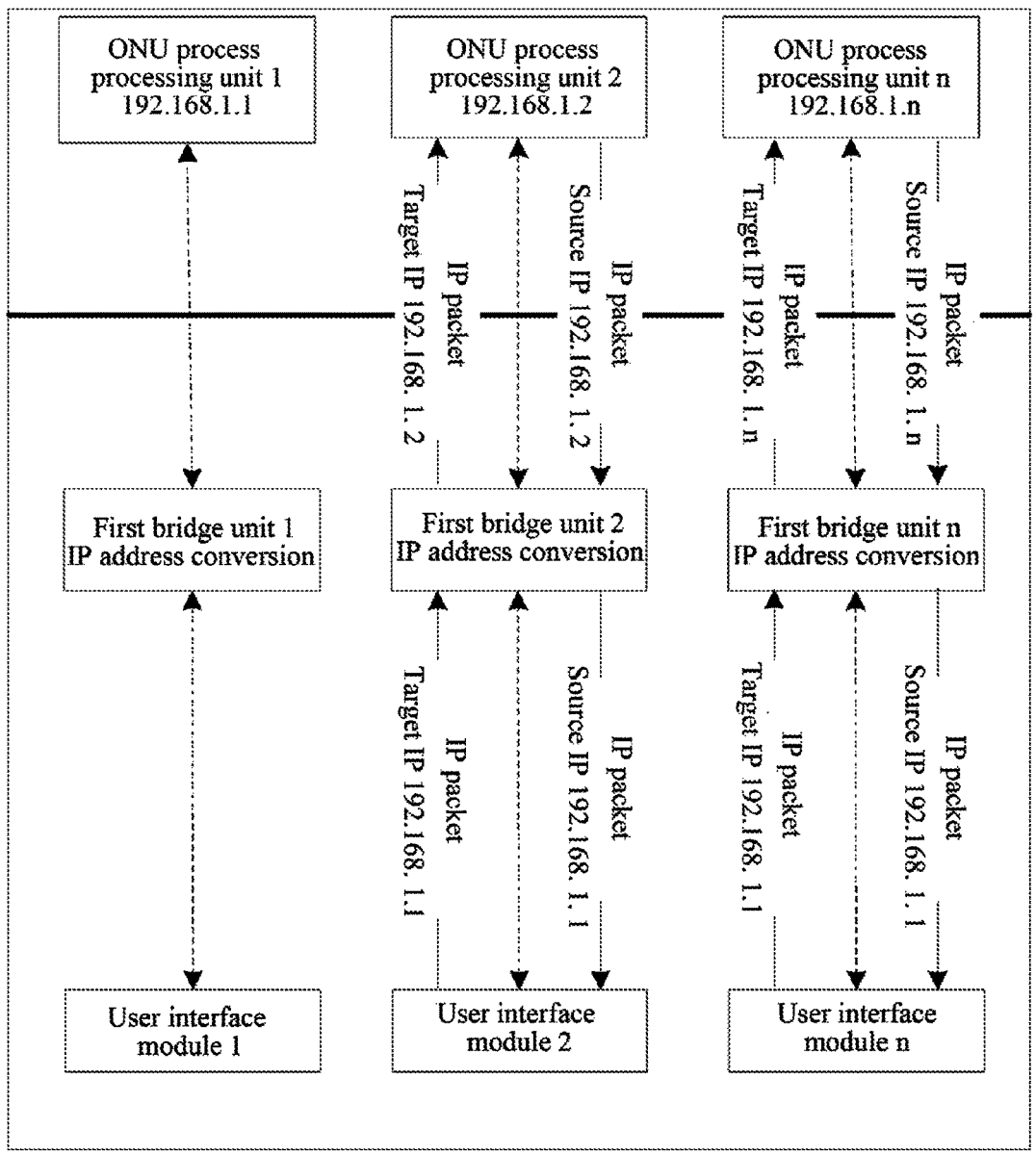
FIG. 6 is a schematic diagram of IP address allocation of the ONU submodules provided in the embodiment of the present document.

With reference to FIG. 6, the existing local IP address of each ONU is generally set as 192.168.1.1, as long as a user logs in the 192.168.1.1, the ONU can be accessed, when one ONU includes multiple virtual ONU submodules, in order to maintain the users' habits, each user logs in the 192.168.1.1, addresses of the user side may also be the same, thus connections of all the users cannot be distinguished through a quintuple at the transmission layer of the protocol stack. Therefore, each ONU submodule in the embodiment uses a different IP address, that is, one IP address is allocated to each ONU submodule. For example, the ONU has 8 ONU submodules, the first ONU submodule uses an IP address 192.168.1.1, the second ONU submodule uses 192.168.1.2, and so forth, the eighth ONU submodule uses 192.168.1.8, and a shared IP address of the ONU can be set as any one of the eight IP addresses, and certainly another IP address also can be set separately; descriptions will be made with an example that the shared IP address is the IP address 192.168.1.1 used by the first ONU submodule in the embodiment. For example, in order to access a user of the eighth ONU submodule with the address 192.168.1.1, we can make a conversion when an IP packet goes through the first bridge unit, if a target IP of an IP packet entering from the network side is 192.168.1.1, the target IP is converted to 192.168.1.8, and with regard to an IP packet going out from the user side, a source IP 192.168.1.8 is converted to 192.168.1.1, that is, an IP address conversion table is placed at a processing point of the first bridge unit, thus it is able to guarantee that each ONU user can access the ONU with the 192.168.1.1, in order to coordinate this function, when a DHCP server allocates addresses, 192.168.1.1~192.168.1.8 cannot be allocated to the ONU users any more, and the specific number of IP addresses required to be retained is equal to the number of ONU submodules.

As can be known from the above analysis, the processing module in the embodiment also includes a physical bridge submodule (also called a second bridge submodule in the present document), with reference to FIG. 4, the second bridge submodule is also configured to perform port conversion on the data from the user side and then send to the corresponding virtual bridge units and perform port conversion on the data from the corresponding virtual bridge units and then send to Ethernet ports. Specifically, a physical port is converted to a virtual port corresponding to the first bridge, and is forwarded to the corresponding first bridge unit; or data are received from the first bridge unit, and the virtual port of the first bridge unit is converted to the physical port. The user interface module is connected with the first bridge unit of the corresponding ONU submodule via the second bridge submodule.

Based on the above multiple ONU submodules set in the processing module, it can be implemented that multiple ONUs make successful registration simultaneously and enter a service state under the hardware architecture shown in FIG. 2.

The present document will be further described in combination with the example of up-direction and down-direction data stream trends in an environment of the virtual ONU submodules below.

Figure 7:
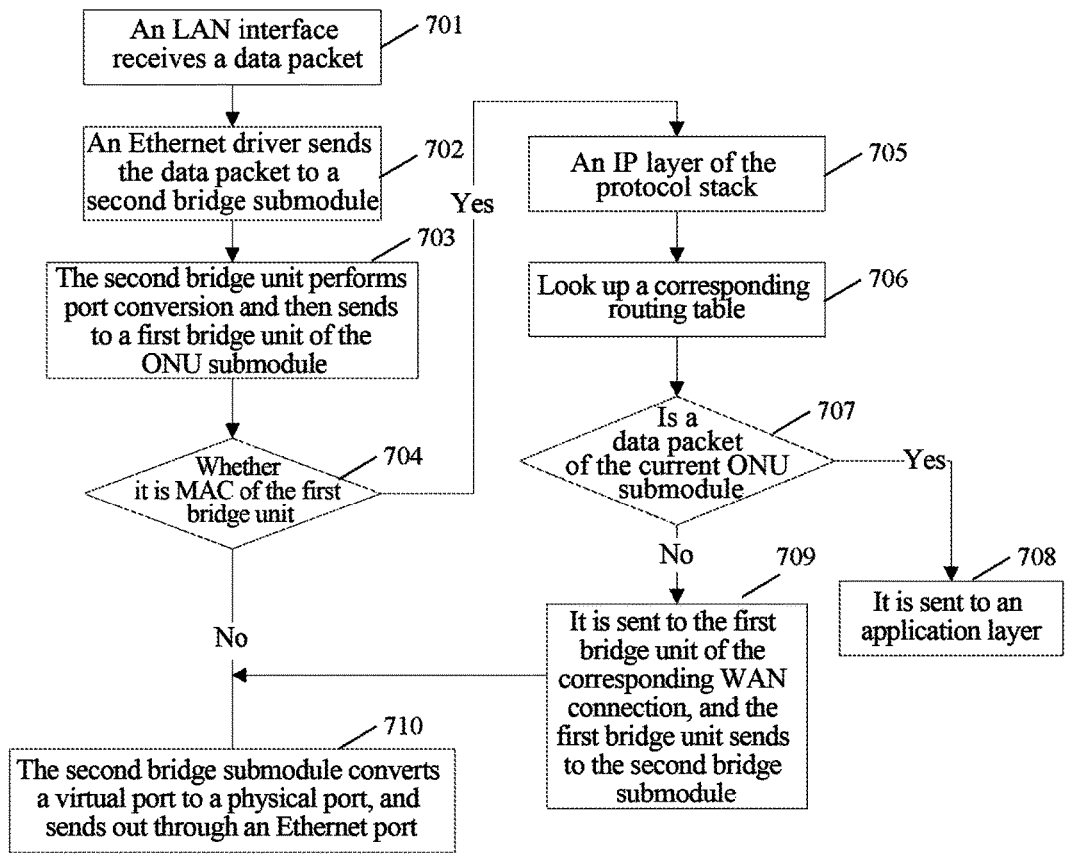
FIG. 7 is a schematic diagram of a transmission flow of an uplink data stream provided in the embodiment of the present document.

In an up direction, with reference to FIG. 7, the following steps are included.

In step 701, after receiving a data packet, a user receiving interface (an LAN interface) on a user interface module forwards the data packet to a processing module CPU via a Switch chip;

In step 702, after receiving the data packet, an Ethernet driver of the kernel (i.e. a bottomed module of the physical bridge) sends the data packet to a physical bridge submodule of the protocol stack (i.e. a second bridge submodule;

In step 703, the second bridge submodule converts a user port to a virtual port corresponding to a virtual ONU, and sends the data packet to a corresponding ONU submodule;

The following steps 704~710 are a process of the ONU submodule processing the received data.

In step 704, a first bridge unit of the ONU submodule judges a target MAC of the data packet, decides whether to forward the data packet through other ports (including a port of the physical bridge, specifically corresponding to an LAN interface of the user interface card) or deliver the data packet to an IP layer of the protocol stack upward, that is, it is to judge whether it is an MAC of the first bridge unit, if it is the MAC, proceed to step 705; and if it is not the MAC, proceed to step 710;

In step 705, the data packet is sent to the IP layer of the protocol stack upward;

In step 706, an ONU routing unit corresponding to the IP layer seeks a route by using a corresponding routing table;

In step 707, the ONU judges whether the data packet belongs to the current ONU submodule according to a target IP address; if the data packet belongs to the current ONU submodule, proceeds to step 708; and if the data packet does not belong to the current ONU submodule, proceeds to step 709;

In step 708, the data packet is sent to an ONU process processing unit of the corresponding ONU submodule via a socket interface, that is, it is uploaded to an application layer to be processed;

In step 709, a first bridge unit corresponding to the WAN connection is found through the routing table and the data packet is forwarded to the first bridge unit, the first bridge unit of the ONU submodule sends the data packet to the second bridge submodule of the protocol stack; and then it proceeds to step 710;

As can be seen from the above flow, the ONU submodule only processes a data packet whose target MAC and target IP simultaneously conform to the MAC and IP corresponding to the ONU submodule, and if the target MAC and target IP do not simultaneously conform to the MAC and IP corresponding to the ONU submodule, returns to the second bridge submodule, and the second bridge submodule processes the data packet.

In step 710, the second bridge submodule of the kernel converts the virtual port of the virtual ONU to a physical port, and sends the data packet out through an Ethernet port.

Figure 8:
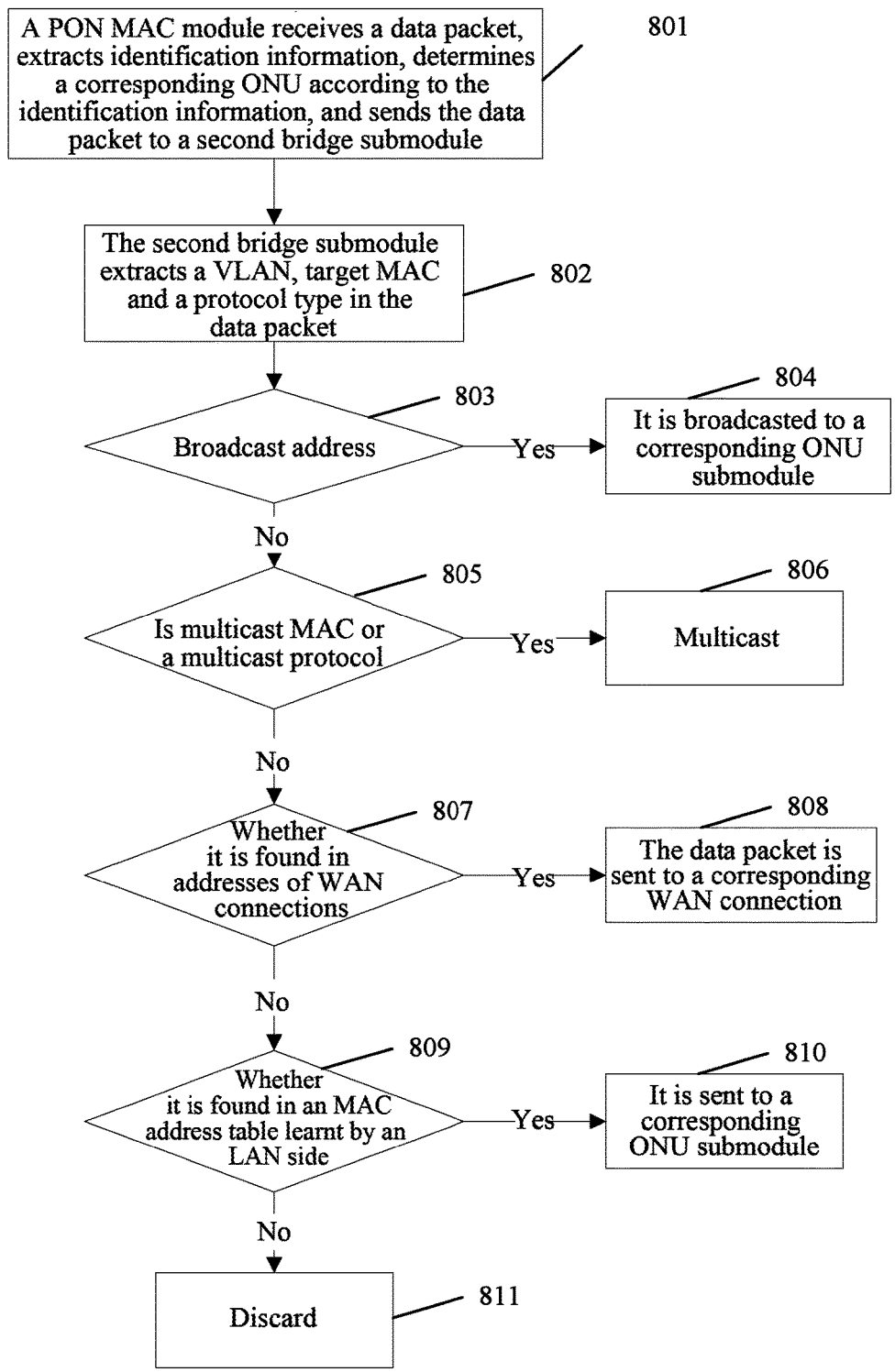
FIG. 8 is a schematic diagram of a transmission flow of a downlink data stream provided in the embodiment of the present document.

In a down direction, with reference to FIG. 8, the following steps are included.

In step 801, a PON MAC module receives a data packet, extracts identification information in the data packet, determines a corresponding ONU according to the identification information, and sends the data packet to a second bridge submodule.

For a GPON, the identification information is a GEMPORT or an ONUID, and for an EPON, the identification information is a PONMAC address or an LLID.

Understandably, the PON MAC module receives the data packet sent from the network side from an optical module.

Specifically, the PON MAC module adds information of the ONU submodule into the data packet to send to the second bridge submodule, or after sending the data packet, sends information of an association relationship between the data packet and the corresponding ONU submodule to the second bridge submodule.

In step 802, the second bridge submodule acquires a target MAC address of the data packet and virtual local area network (VLAN) information.

In step 803, the second bridge submodule judges whether it is a broadcast address, if it is the broadcast address, proceeds to step 804; and if it is not the broadcast address, proceeds to step 805.

In step 804, the second bridge submodule performs broadcasting to the corresponding ONU submodule according to the ONU submodule determined by the PON MAC module, and the ONU submodule executes the steps 704 to 709 in FIG. 7 after performing receiving.

In step 805, the second bridge submodule judges whether it is a multicast address or a multicast protocol, if it is the multicast address or multicast protocol, proceeds to step 806; and if it is not the multicast address or multicast protocol, proceeds to step 807.

In step 806, the second bridge submodule transmits the data packet according to the multicast protocol.

In step 807, the second bridge submodule looks up in an MAC address table of WAN connections, if found, proceeds to step 808; and if not found, proceeds to step 809.

In step 808, the second bridge submodule sends the data packet to a corresponding WAN connection.

In step 809, the second bridge submodule looks up in an MAC address table learned by the LAN side, if found, proceeds to step 810; and if not found, proceeds to step 811.

In step 810, the second bridge submodule sends the data packet to the corresponding ONU submodule according to the ONU submodule determined by the PON MAC module.

Specifically, the ONU submodule executes the steps 704 to 709 in FIG. 7 after receiving the data packet, which will not be repeated here.

In step 811, the second bridge submodule discards the data packet.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The embodiment of the present document is not limited to any combination of hardware and software in a specific form.

INDUSTRIAL APPLICABILITY

Compared with the related art, the ONU provided in the embodiment of the present document comprises a passive optical network media access control (PON MAC) module, a processing module and at least two user interface modules, the processing module comprises a physical bridge submodule and at least two ONU submodules connected with the physical bridge submodule, the ONU submodules are in one-to-one correspondence with the user interface modules, and different ONU submodules correspond to different identification information; the PON MAC module determines corresponding ONU submodules according to identification information in network side data, and sends the network side data to the physical bridge submodule. As it can be seen that, the ONU provided in the embodiment of the present document is not required to set the CPU and PON MAC, etc. on each user interface card, it is only required to set a user interface circuit on the user interface card, then all functions of one existing ONU are implemented by coordinating with the corresponding ONU submodules in the processing module, and it is not required to set the FPGA to implement the switching to the ONU, therefore, while the hardware cost is greatly reduced, a limitation of the FPGA switching to the existing ONU can be removed, and an uplink interface rate can be increased. Moreover, since shared PONMAC is used, the OLT can distinguish a virtual ONU, thus the virtual ONU can be managed by using an OMCI or an extended OAM protocol.

What is claimed is:

1. An optical network unit (ONU), comprising hardware performing instructions stored in a non-transitory computer readable medium which executes steps in following modules: a passive optical network media access control (PON MAC) module, a processing module and at least two user interface modules, wherein, the processing module comprises a physical bridge submodule and at least two ONU submodules connected with the physical bridge submodule, the ONU submodules are in one-to-one correspondence with the user interface modules, and different ONU submodules correspond to different identification information;

wherein the PON MAC module is configured to: be connected with the processing module, and receive network side data, wherein the network side data comprise identification information; determine corresponding ONU submodules according to the identification information in the network side data, and send the network side data to the physical bridge submodule;

the physical bridge submodule is configured to: distribute the network side data to corresponding ONU submodules according to the ONU submodules determined by the PON MAC module; and each of the ONU submodules is configured to: process the received data, and then send the processed data to the user interface module corresponding to each of the ONU submodules; wherein, each of the ONU submodules comprises an ONU process processing unit, an ONU routing unit and a virtual bridge unit connected in turn;

the virtual bridge unit is configured to: store port information of each of the ONU submodules, and send data from a user side to the ONU process processing unit via the ONU routing unit; wherein the virtual bridge units of the various ONU submodules are mutually isolated;

the ONU routing unit is configured to: set a routing table for the ONU submodules; and the ONU process processing unit is configured to: process the received data from the user side; wherein, the physical bridge submodule is configured to: be connected with the virtual bridge units of the ONU submodules respectively, perform port conversion on the data from the user side and then send to the corresponding virtual bridge units and perform port conversion on the data from the corresponding virtual bridge units and then send to Ethernet ports.

2. The ONU according to claim 1, wherein, the PON MAC module is configured to: add information of the ONU submodules into a data packet to send to a second bridge submodule, or after sending the data packet, send information of an association relationship between the data packet and the corresponding ONU submodules to the second bridge submodule.

3. The ONU according to claim 1, wherein, the identification information is an optical network unit identifier (ONUID), a gigabit-capable passive optical network (GOPN) encapsulation port (GEMPORT), a passive optical network media access control (PON MAC) address or a logical link identifier (LLID).

4. A communication system, comprising an optical line terminal and an ONU according to claim 1, wherein the optical line terminal is in a communication connection with the ONU.

5. The communication system according to claim 4, further comprising a server, wherein the server is in a communication connection with the ONU.

6. The ONU according to claim 2, wherein, the identification information is an optical network unit identifier (ONUID), a gigabit-capable passive optical network (GOPN) encapsulation port (GEMPORT), a passive optical network media access control (PON MAC) address or a logical link identifier (LLID).

7. A communication method for an ONU, wherein, the ONU comprises hardware performing instructions stored in a non-transitory computer readable medium which executes steps in following modules: a passive optical network media access control (PON MAC) module, a processing module and at least two user interface modules, the processing module comprises a physical bridge submodule and at least two ONU submodules connected with the physical bridge submodule, the ONU submodules are in one-to-one correspondence with the user interface modules, and different ONU submodules correspond to different identification information;

the PON MAC module receives network side data, wherein the network side data comprise identification information;

the PON MAC module determines corresponding ONU submodules according to the identification information in the network side data, and sends the network side data to the physical bridge submodule;

the physical bridge submodule distributes the network side data to corresponding ONU submodules according to the ONU submodules determined by the PON MAC module; and each of the ONU submodules processes the received data and sends the processed data to the user interface module corresponding to each of the ONU submodule;

wherein, each of the ONU submodules comprises an ONU process processing unit, an ONU routing unit and a virtual bridge unit connected in turn;

the virtual bridge unit stores port information of each of the ONU submodules, and send data from a user side to the ONU process processing unit via the ONU routing unit; wherein the virtual bridge units of the various ONU submodules are mutually isolated;

the ONU routing unit sets a routing table for the ONU submodules; and the ONU process processing unit processes the received data from the user side; wherein, the physical bridge submodule connects with the virtual bridge units of the ONU submodules respectively, performs port conversion on the data from the user side and then sends to the corresponding virtual bridge units and performs port conversion on the data from the corresponding virtual bridge units and then sends to Ethernet ports.

8. The communication method for the ONU according to claim 7, wherein, the PON MAC module is configured to: add information of the ONU submodules into a data packet to send to a second bridge submodule, or after sending the data packet, send information of an association relationship between the data packet and the corresponding ONU submodules to the second bridge submodule.

9. The communication method for the ONU according to claim 7, wherein, the identification information is an optical network unit identifier (ONUID), a gigabit-capable passive optical network (GPON) encapsulation port (GEMPORT), a passive optical network media access control (PON MAC) address or a logical link identifier (LLID).

* * * * *